(12) United States Patent  
Sato

(10) Patent No.: US 11,329,428 B2  
(45) Date of Patent: May 10, 2022

(54) POWER SUPPLY CIRCUIT BREAKER DEVICE

(71) Applicant: Yazaki Corporation, Tokyo (JP)

(72) Inventor: Takahiko Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/167,100

(22) Filed: Feb. 4, 2021

(65) Prior Publication Data

US 2021/0242629 A1 Aug. 5, 2021

(30) Foreign Application Priority Data

Feb. 5, 2020 (JP) .............................. JP2020-017777

(51) Int. Cl.
*H01R 13/629* (2006.01)
*H01R 13/04* (2006.01)
*H01R 13/11* (2006.01)
*B60R 16/033* (2006.01)

(52) U.S. Cl.
CPC ....... *H01R 13/62955* (2013.01); *H01R 13/04* (2013.01); *H01R 13/113* (2013.01); *B60R 16/033* (2013.01); *H01R 2201/26* (2013.01)

(58) Field of Classification Search
CPC .............. H01R 13/62955; H01R 13/04; H01R 13/113; H01R 2201/26; H01R 13/112; H01R 13/635; H01R 13/713; B60R 16/033

See application file for complete search history.

(56) References Cited

U.S. PATENT DOCUMENTS

| 8,734,170 | B2 | 5/2014 | Ikeda et al. | |
| 9,018,550 | B2 * | 4/2015 | Kobayashi | H01H 9/104 200/50.01 |
| 10,320,119 | B2 * | 6/2019 | Shimeno | H01R 13/04 |
| 2005/0098419 | A1 * | 5/2005 | Matsui | H01R 13/62933 200/311 |
| 2015/0064954 | A1 * | 3/2015 | Tabata | H01R 13/6295 439/342 |

(Continued)

FOREIGN PATENT DOCUMENTS

| EP | 2843773 A1 | 3/2015 |
| JP | 2013-62043 A | 4/2013 |

*Primary Examiner* — Abdullah A Riyami
*Assistant Examiner* — Nelson R. Burgos-Guntin
(74) *Attorney, Agent, or Firm* — Kenealy Vaidya LLP

(57) ABSTRACT

A service plug includes first and second main terminals, first and second signal terminals, a lock part that locks a lever to a second connector housing to regulate rotation of the lever in a state in which the lever is positioned at a half-engaged position between a completely engaged position and a non-engaged position, and a lock releasing part that releases a lock state. A configuration is made such that, as the lever is rotated from the completely engaged position to the half-engaged position, part of a plurality of contact pieces of the second main terminal that is brought into elastic contact with the first main terminal at a position displaced in an approaching direction, and the other part of the contact pieces maintains elastic contact at a position that is not displaced in the approaching direction and a separating direction.

4 Claims, 11 Drawing Sheets

(56) References Cited

U.S. PATENT DOCUMENTS

| | | | |
|---|---|---|---|
| 2015/0079830 A1* | 3/2015 | Iwatani | H01R 13/6295 |
| | | | 439/310 |
| 2016/0056573 A1* | 2/2016 | Kamei | H01R 13/62977 |
| | | | 439/660 |
| 2017/0331226 A1* | 11/2017 | Tabata | H01R 13/62938 |
| 2018/0054025 A1* | 2/2018 | Tabata | H01R 13/6295 |
| 2018/0145453 A1* | 5/2018 | Tabata | H01R 13/641 |
| 2018/0145454 A1* | 5/2018 | Tabata | H01R 13/7036 |
| 2021/0129691 A1* | 5/2021 | Gorantla Narayana Murthy | |
| | | | H01R 13/7036 |
| 2021/0242629 A1* | 8/2021 | Sato | H01R 13/635 |

* cited by examiner

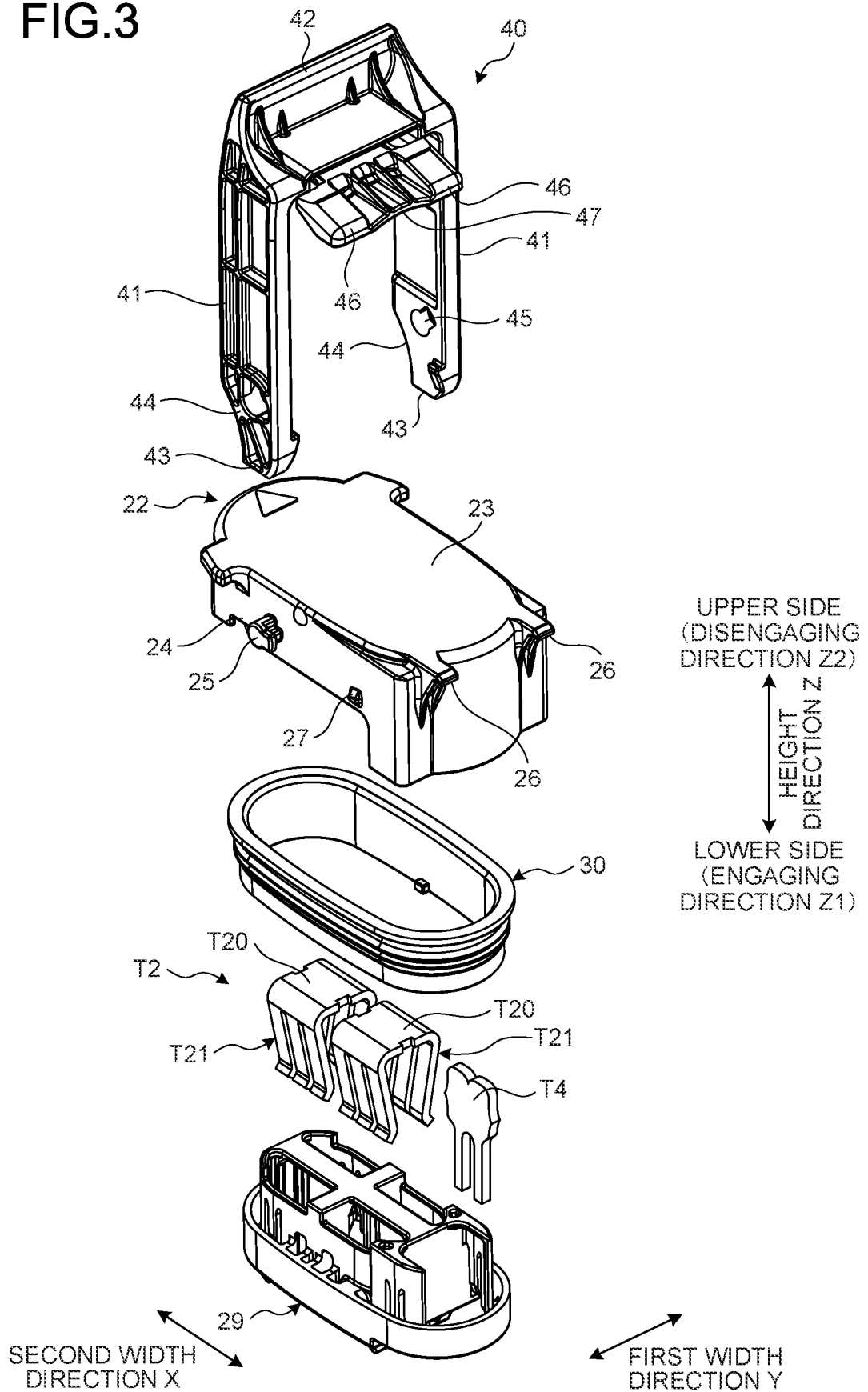

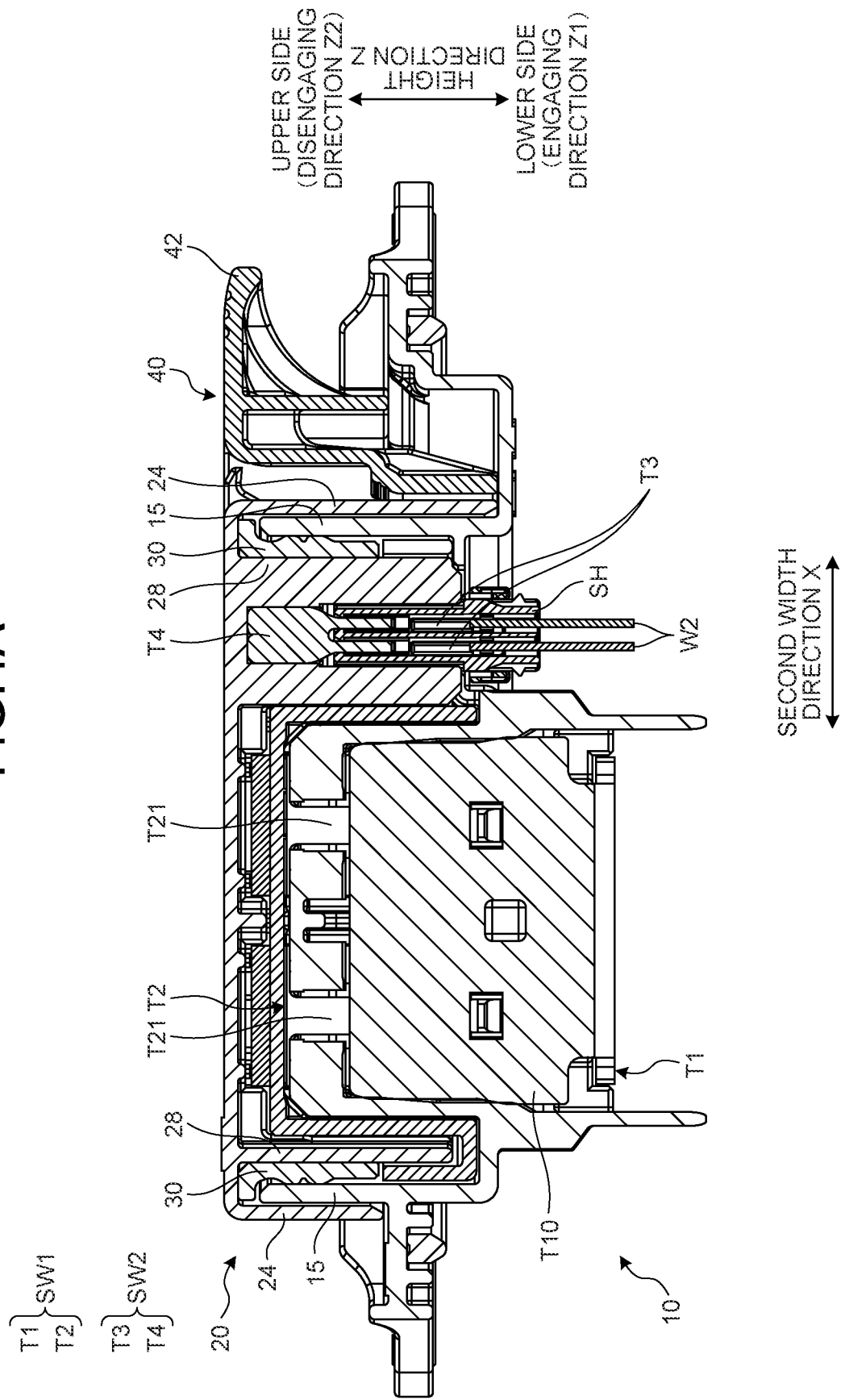

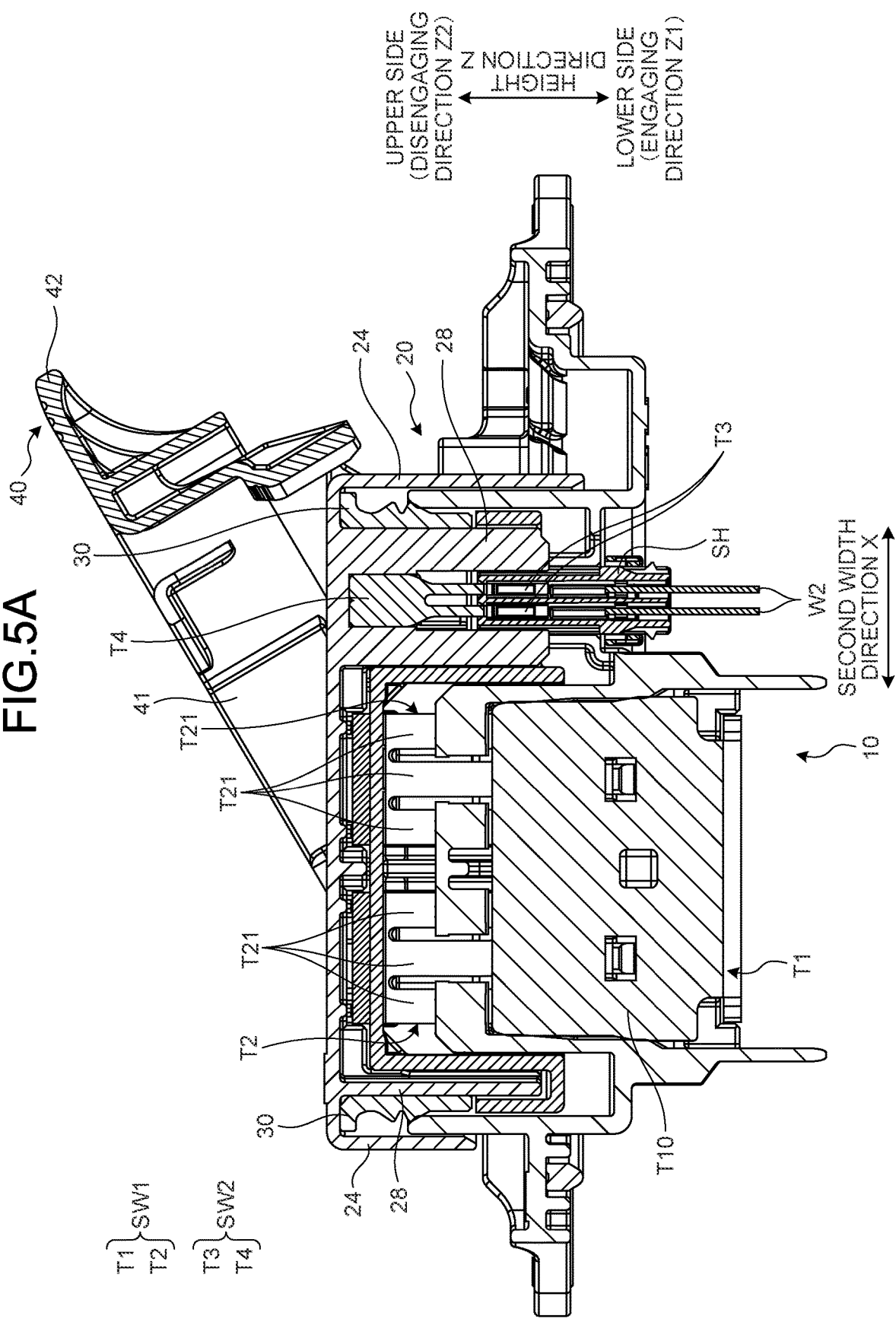

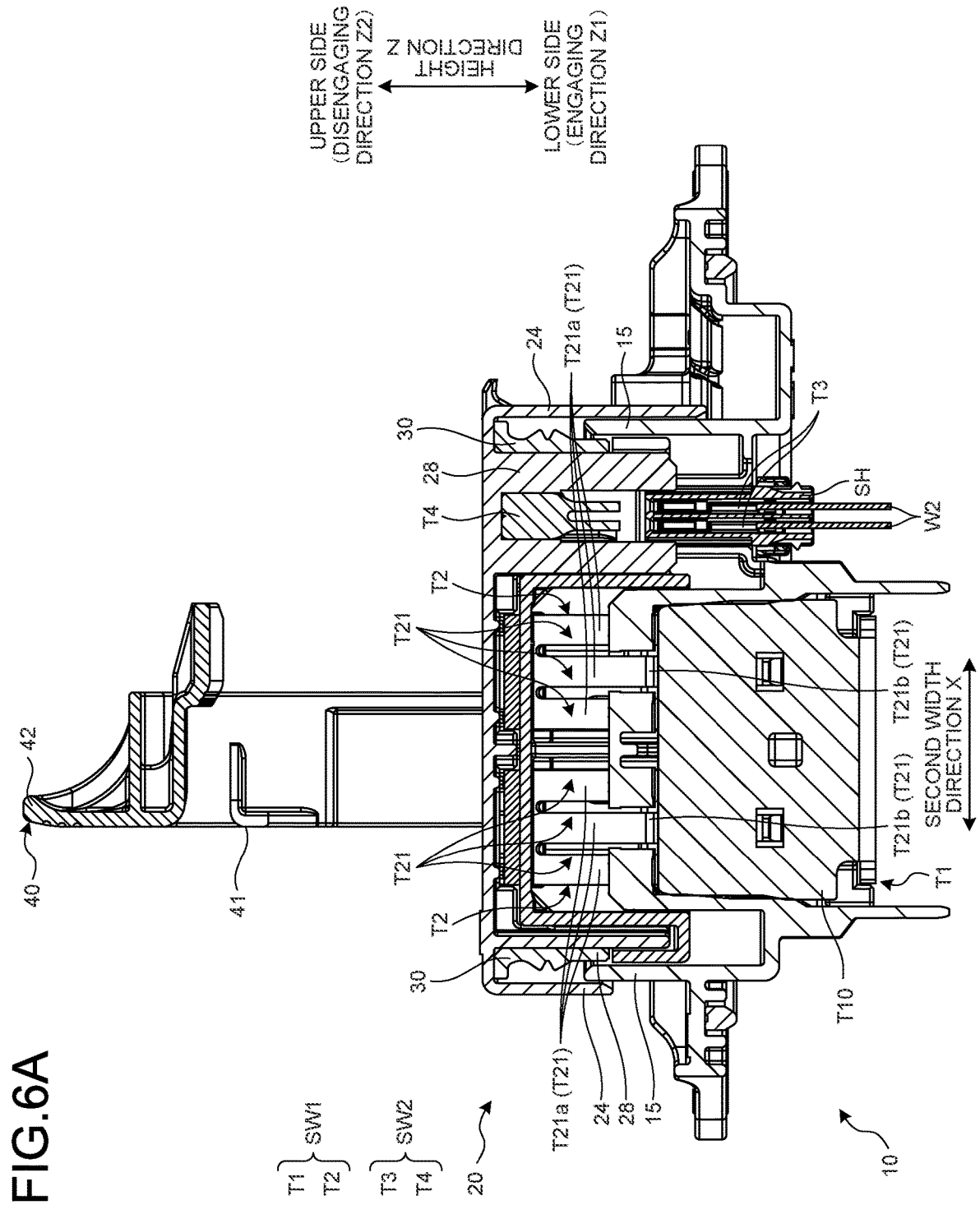

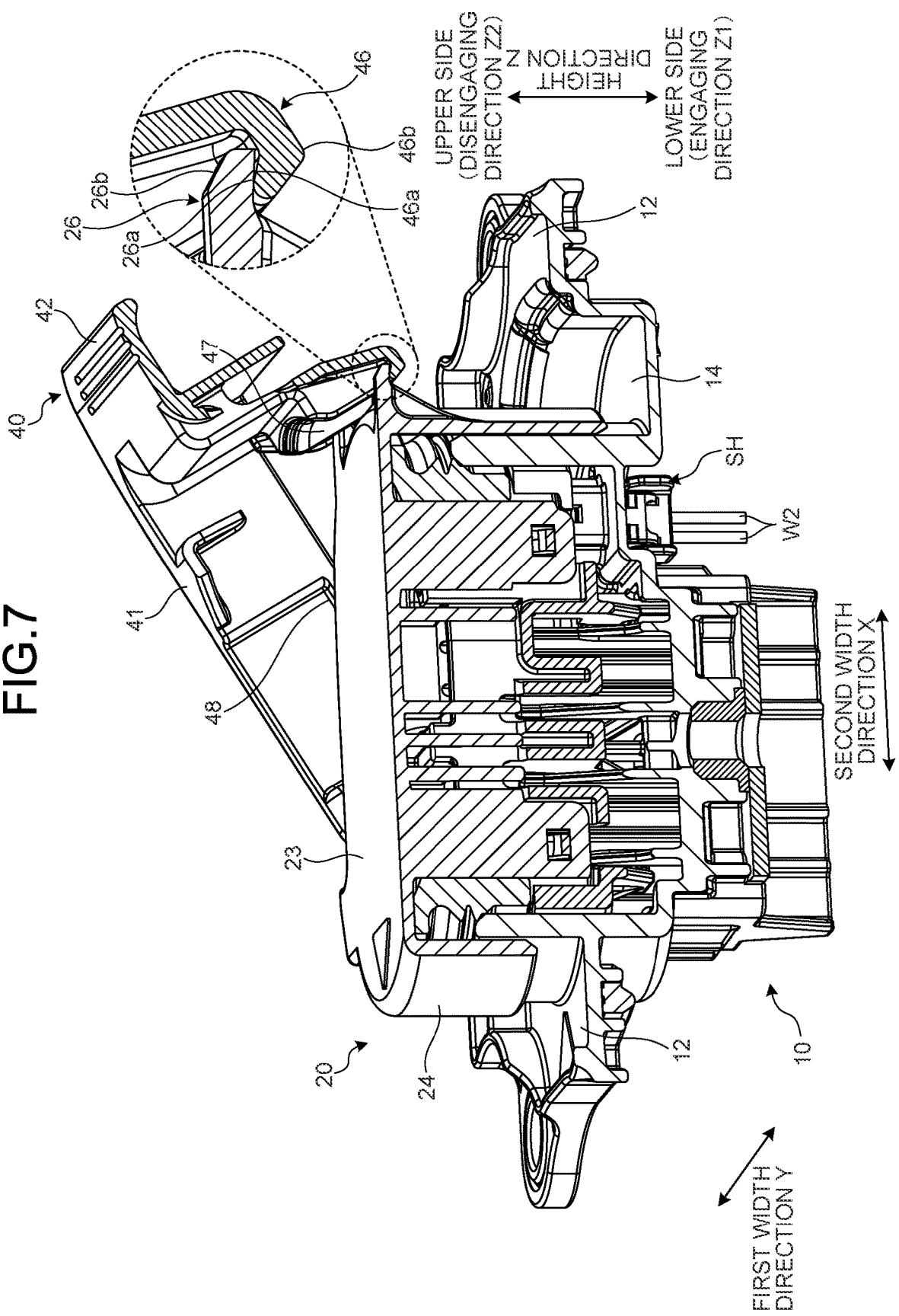

POWER SUPPLY CIRCUIT BREAKER DEVICE

CROSS-REFERENCE TO RELATED APPLICATION(S)

The present application claims priority to and incorporates by reference the entire contents of Japanese Patent Application No. 2020-017777 filed in Japan on Feb. 5, 2020.

BACKGROUND OF THE INVENTION

1. Field of the Invention

The present invention relates to a power supply circuit breaker device.

2. Description of the Related Art

In the related art, there is known a power supply circuit breaker device (service plug) that is mainly mounted on a vehicle such as an electric vehicle and a hybrid vehicle, incorporated is a power supply circuit for supplying power to a load unit such as a rotary electric machine from a power supply unit such as a battery, and able to connect or break the power supply circuit as needed. The power supply circuit breaker device includes a pair of main terminals functioning as a main circuit switch that switches the power supply circuit between an energizable state and a breaking state, and a pair of signal terminals functioning as a signal circuit switch that switches the power supply circuit between an energized state and a non-energized state. When the pair of main terminals and the pair of signal terminals are both in an unconnected state, the power supply circuit is broken.

As such a power supply circuit breaker device, for example, Japanese Patent Application Laid-open No. 2013-62043 discloses a configuration having a Low Insertion Force (LIF) lever structure. In the configuration disclosed in Japanese Patent Application Laid-open No. 2013-62043, a lever is rotated from a state in which the lever is positioned at an engaging position to a disengaging position side at the time of performing a breaking operation for the power supply circuit. In this rotation operation, at a predetermined middle position between the engaging position and the disengaging position, the signal terminal is caused to be in an unconnected state, the signal circuit switch is caused to be in an OFF state, a locking part of the lever is locked to a connector, and rotation of the lever is temporarily stopped. Next, after an operator operates a release operation unit to release the locking state or the locking part, the lever is rotated to the disengaging position, a strong current terminal (main terminal) is caused to be in an unconnected state, the main circuit switch is caused to be in the OFF state, and as a result, the power supply circuit is broken. In this way, for the power supply circuit breaker device in the related art, used is a procedure of firstly switching the signal circuit switch to be in the OFF state to cause the power supply circuit to be in the non-energized state, and switching the main circuit switch to be in the OFF state to cause the power supply circuit to be in the breaking state at the time of breaking the power supply circuit.

However, when the locking part of the lever is locked to the connector and rotation of the lever is temporarily stopped at the middle position described above, the par of main terminals sliding with respect to each other is temporarily stopped as the lever rotates from the engaging position to the middle position. Thus, at the time of releasing the locked state of the locking part of the lever to rotate the lever again by operation of the release operation unit, static friction force is generated between the pair of main terminals. Typically, a maximum value of the static friction force is larger than dynamic friction force, so that large operation force is required at the time of rotating the lever again.

SUMMARY OF THE INVENTION

The present invention has been made in view of the above-described situation, and provides a power supply circuit breaker device that temporarily stop rotation of the lever, suppresses static friction force generated between the pair of main terminals at the time of repeated rotation, and improves operability related to disengagement of the connector at the time of performing a breaking operation for a power supply.

In order to achieve the above mentioned object, a power supply circuit breaker device according to one aspect of the present invention includes a pair of first terminals configured to switch between an energizable state and a breaking state of a power supply circuit by being connected with or released from each other; a pair of second terminals configured to switch between an energized state and a non-energized state of the power supply circuit by being connected with or released from each other; a first connector housing including one of the pair of first terminals and one of the pair of second terminals; a second connector housing that includes the other one of the pair of first terminals, and is disposed to be able to be engaged with the first connector housing; a lever that is disposed on the second connector housing in a rotatable manner, includes an operation part at a rotation end part, and is configured co rotate between a completely engaged position at which the operation part side becomes the closest to the first connector housing side and a non-engaged position at which the operation part side becomes the most distant from the first connector housing; a lock part configured to lock the lever to the first connector housing or the second connector housing to regulate rotation of the lever in a state in which the lever is positioned at a predetermined middle position between the completely engaged position and the non-engaged position; and a lock releasing part configured to release a lock state of the lock part, wherein the other one of the pair of second terminals is disposed on the lever or the second connector housing, both of the pair of first terminals and the pair of second terminals are in a connected state in a completely engaged state in which the second connector housing is engaged with the first connector housing and the lever is positioned at the completely engaged position, the pair of first terminals is in the connected state and the pair of second terminals is in an unconnected state in a half-engaged state in which the lever is positioned at the middle position and rotation of the lever is regulated by the lock part, the other one of the pair of first terminals includes a plurality of contact pieces that are able to be elastically displaced in a direction in which elastic force acts on one of the pair of first terminals, a position at which the contact pieces are brought into elastic contact with one of the pair of first terminals in a direction in which the elastic force acts in the completely engaged state is assumed to be a contact position at the time of complete engagement, and part of the contact pieces is brought into elastic contact with one of the pair of first terminals and the other part of the contact pieces is at the contact position at the time of complete engagement at a position that is further displaced in a direction in which elastic force acts on the pair of first terminals as compared with the contact position at the time of complete engagement in the half-engaged state.

According to another aspect of the present invention, in the power supply circuit breaker device, it is possible to configure that a contact pressure applied to a contact between the pair of first terminals connected to each other is larger than a contact pressure applied to a contact between the pair of second terminals connected to each other.

According to still another aspect of the present invention, in the power supply circuit breaker device, it is possible to configure that one of the pair of first terminals includes a flat plate part that is formed in a plane shape along an inserting and extracting direction of the second connector housing with respect to the first connector housing, a plurality of projecting parts that are able to be brought into contact with the respective contact pieces are formed on a surface of the flat plate part, the projecting parts have a length along the inserting and extracting direction so that the projecting parts are respectively brought into contact with the contact pieces in the completely engaged state, and the part of the contact pieces is separated from part of the projecting parts and brought into elastic contact with the flat plate part, and the other part of the contact pieces is brought into elastic contact with the other part of the projecting parts in the half-engaged state.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an exploded perspective view of a second connector in FIG. 1;

FIG. 4A is a cross-sectional view in a second width direction X of the service plug at the time of completely engaged state;

FIG. 5A is a cross-sectional view in the second width direction X of the service plug at the time of half-engaged state;

FIG. 6A is a cross-sectional view in the second width direction X of the service plug at the time of non-engaged state;

FIG. 7 is a cross-sectional perspective view of the service plug illustrating a lock state in which rotation of a lever is temporarily regulated in the half-engaged state at the time of rotating the lever to be in the non-engaged state from the completely engaged state.

DETAILED DESCRIPTION OF THE PREFERRED EMBODIMENTS

The following describes an embodiment of a power supply circuit breaker device according to the present invention in detail based on the drawings. The present invention is not limited to this embodiment.

Embodiment

Figure 1:
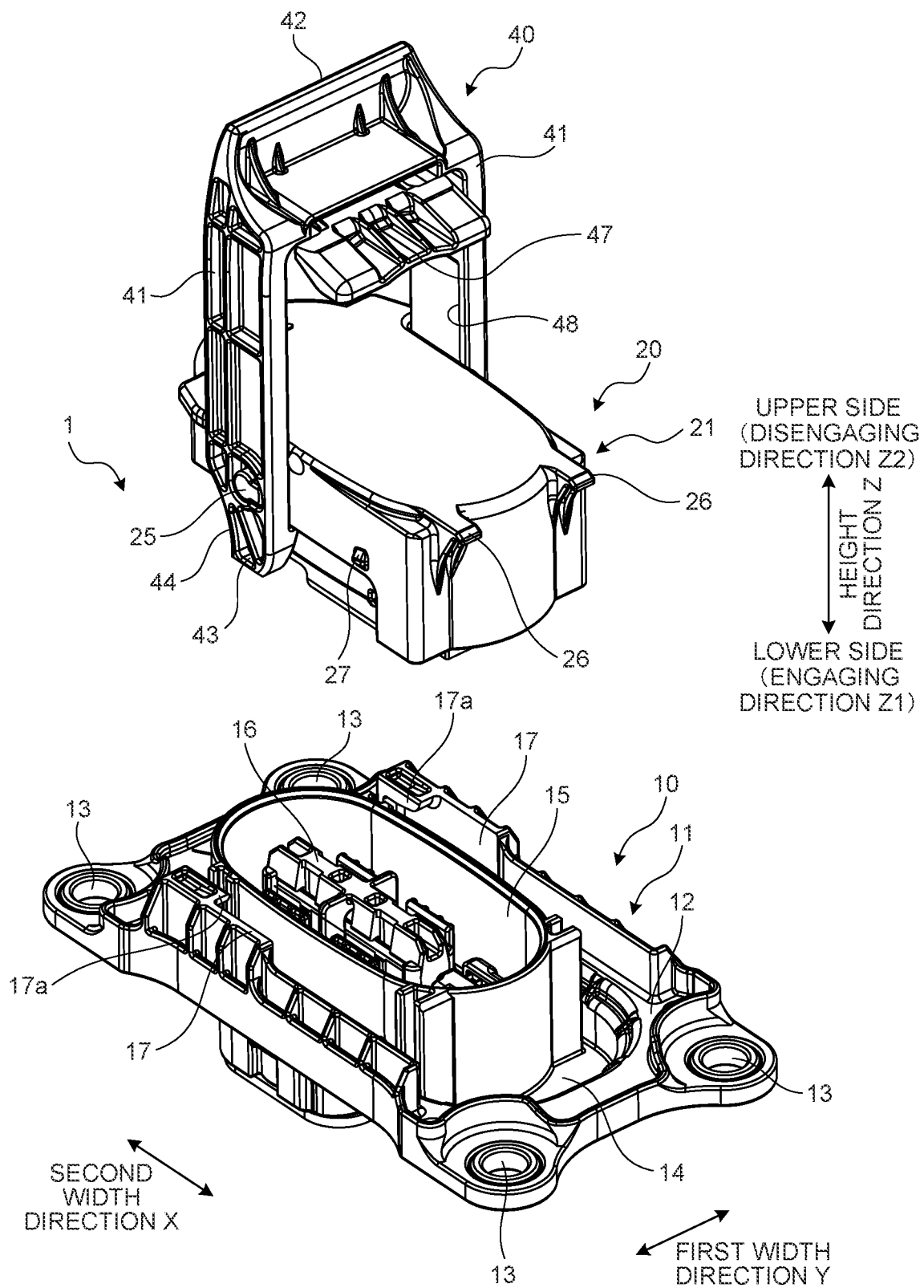
FIG. 1 is an exploded perspective view illustrating a schematic configuration of a service plug as an example of a power supply circuit breaker device according to an embodiment of the present invention.
Figure 2:
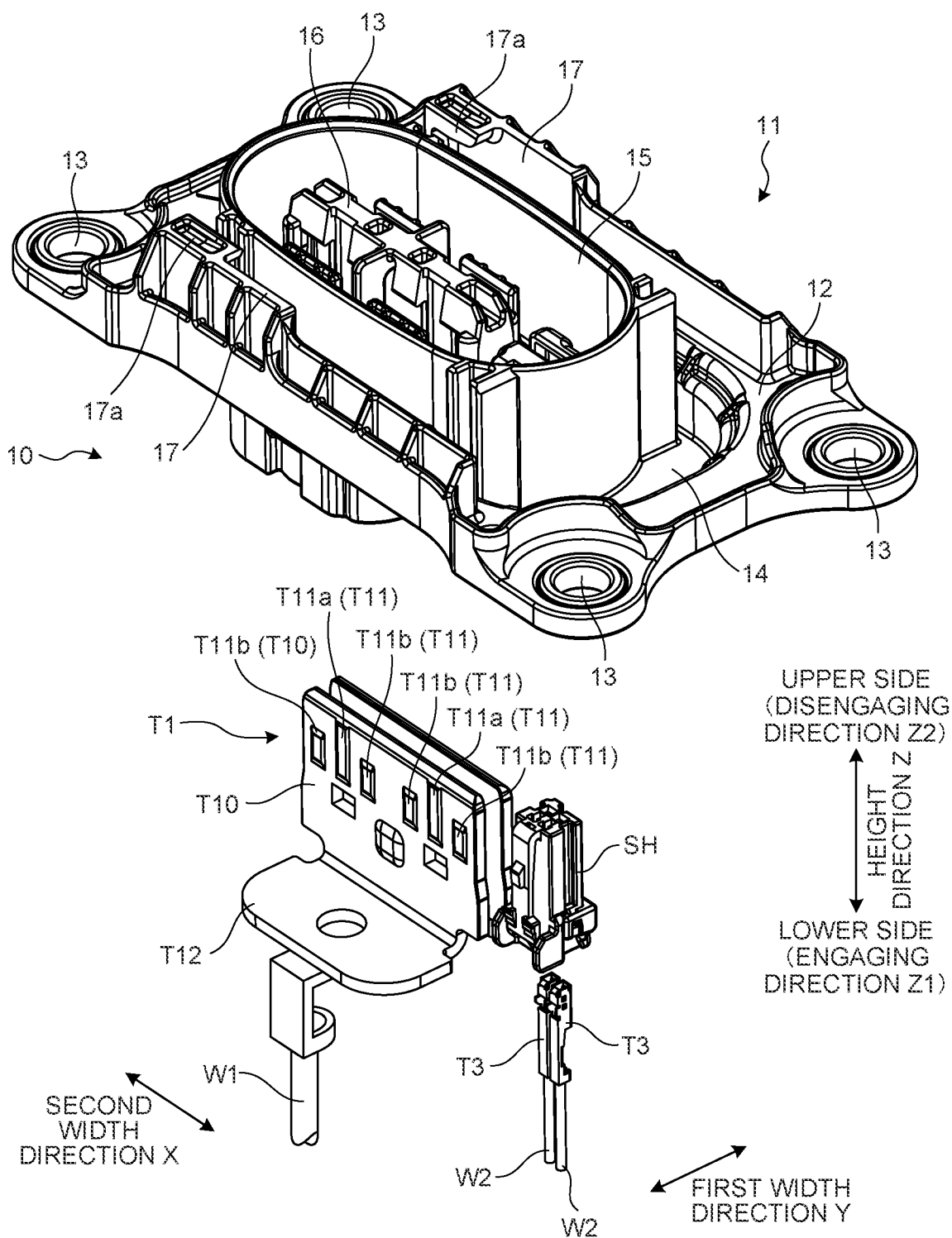
FIG. 2 is an exploded perspective view of a first connector in FIG. 1.

FIG. 1 is an exploded perspective view illustrating a schematic configuration of an embodiment of a power supply circuit breaker device (service plug 1) according to the present invention. FIG. 2 is an exploded perspective view of a first connector in FIG. 1. FIG. 3 is an exploded perspective view of a second connector in FIG. 1. FIG. 7 is a cross-sectional perspective view of the service plug illustrating a lock state in which rotation of a lever is temporarily regulated in a half-engaged state at the time of rotating the lever to be in a non-engaged state from a completely engaged state.

The service plug 1 as a power supply circuit breaker device according to the present embodiment is a device that is mainly mounted on a vehicle such as an electric vehicle and a hybrid vehicle, incorporated in a power supply circuit (not illustrated) for supplying power to a load unit such as a rotary electric machine from a power supply unit such as a battery, and connects (energizes, does not break) or breaks the power supply circuit as needed. For example, at the time of work such as inspection and maintenance, the configuration is made such that the power supply circuit is broken to be in a non-energized state by the service plug 1 so that security of an operator can be secured such that electric shock is prevented.

In the present embodiment, the power supply circuit in which the service plug 1 is incorporated has the following configuration, for example. In the power supply circuit, a main circuit switch SW1 (refer to FIG. 4A) and a relay circuit are connected in series between the power supply unit and the load unit. The main circuit switch SW1 is a mechanical switch that switches states of the power supply unit and the load unit between an electrically connected energizable state (ON state) and an electrically broken state (OFF state). The relay circuit is an electric circuit the operation of which is controlled by a signal circuit switch SW2 (refer to FIG. 4A), operates to cause the power supply circuit to be in an energized state at the time when the signal circuit switch SW2 is in the ON state, and stops to cause the power supply circuit to be in a non-energized state at the time when the signal circuit switch SW2 is in the OFF state. That is, the power supply circuit is configured to cause the energized state between the power supply unit and the load unit at the time when both of the main circuit switch SW1 and the signal circuit switch SW2 are in the ON state, and cause the non-energized state in other cases.

The service plug 1 according to the present embodiment has functions of the main circuit switch SW1 and the signal circuit switch SW2. More specifically, a first main terminal T1 and a second main terminal T2 (a pair of main terminals) of the service plug 1 (described later) function as the main circuit switch SW1 described above (refer to FIG. 4A), switch the power supply circuit to be in the energizable state when the pair of main terminals is connected, and switch the power supply circuit to be in a breaking state by releasing the connection therebetween. A first signal terminal T3 and a second signal terminal T4 (a pair of signal terminals) of the service plug (described later) function as the signal circuit switch SW2 described above (refer to FIG. 4A), switch the power supply circuit to be in the energized state when the pair of signal terminals is connected, and switch the power supply circuit to be in the non-energized state by releasing the connection therebetween. In a case of breaking the power supply circuit using the service plug 1, a procedure is taken such that the signal circuit switch SW2 is firstly switched to be in the OFF state to cause the power supply circuit to be in the non-energized state, and the main circuit switch SW1 is switched to be in the OFF state to cause the power supply circuit to be in the breaking state thereafter.

In this case, the main circuit switch SW1 is configured as one element on the power supply circuit as described above. The power supply circuit is a circuit that generates a high voltage required for the load unit, so that a high voltage is also applied between the pair of main terminals constituting the main circuit switch SW1. Thus, the main circuit switch SW1 can also be represented as a "high voltage circuit switch", and the pair of main terminals can also be represented as "high voltage-side terminals". On the other hand, the signal circuit switch SW2 is not directly incorporated in the power supply circuit, and makes a control command for an element (a relay or a control circuit) that causes the power supply circuit to be in a non-conductive state. A high voltage is not much required to be applied to the control command, so that a relatively lower voltage is applied between the pair of signal terminals constituting the signal circuit switch SW2 as compared with the pair of main terminals. Thus, the signal circuit switch SW2 can also be represented as a "low voltage circuit switch", and the pair of signal terminals can also be represented as "low voltage-side terminals".

As described above, a relatively higher voltage is applied to the pair of main terminals as compared with the pair of signal terminals, so that the sizes of the terminals themselves are increased in proportion thereto. Thus, a contact pressure applied to a contact between the pair of main terminals connected to each other is higher than a contact pressure applied to a contact between the pair of signal terminals connected to each other.

The signal circuit switch SW2 can be applied not only to the switch of the relay circuit that physically switches energization/non-energization of the power supply circuit but also to control input to the control circuit that controls an operation of the power supply unit of the power supply circuit, for example. In this case, control can be performed so that the power supply unit is driven at the time when the signal circuit switch SW2 is in the ON state, and the power supply unit stops at the time when the signal circuit switch SW2 is in the OFF state.

As illustrated in FIG. 1, the service plug 1 includes a first connector 10, a second connector 20 that is engaged/disengaged with/from the first connector 10, and a lever 40 that is disposed on the second connector 20 in a rotatable manner.

In the following description, an opposing direction of the first connector 10 and the second connector 20 illustrated in FIG. 1 (up and down direction in FIG. 1) is represented as a "height direction Z", a side on which the second connector 20 is positioned is represented as an "upper side", and a side on which the first connector 10 is positioned is represented as a "lower side". The height direction Z is not necessarily the same as the vertical direction. A direction in which the second connector 20 is engaged with the first connector 10, that is, a direction toward the lower side in the height direction is also represented as an "engaging direction Z1", and a direction in which the second connector 20 is disengaged from the first connector 10, that is, a direction toward the upper side in the height direction is also represented as a "disengaging direction Z2". A direction in which a pair of arm parts 41 (described later) of the lever 40 is opposed to each other is represented as a "first width direction Y", and a direction orthogonal to the first width direction and the height direction is represented as a "second width direction X". That is, in a case in which the height direction is the Z-direction, both of the Y-direction and the X-direction are horizontal directions.

Regarding the first width direction Y, it is assumed that an "approaching direction. Ya" represents a direction in which a pair of contact pieces T21 of the second main terminal T2 (described later) is displaced to approach each other to be brought into elastic contact with the first main terminal T1, and a "separating direction Yb" represents a direction in which the pair of contact pieces T21 of the second main terminal T2 is displaced to be separated from each other to be separated from the first main terminal T1.

In the following description, as illustrated in FIG. 1, among positions through which the lever 40 rotates, a "non-engaged position" represents a position at which the lever 40 is in an inverted state in which a longitudinal direction of the lever 40 becomes the height direction. On the other hand, as illustrated in FIG. 4A, a "completely engaged position" represents a position at which the lever 40 rotates by substantially 90 degrees from the non-engaged position toward the lower side in the height direction, and the longitudinal direction of the lever 40 becomes the second width direction X. A "half-engaged position" represents a predetermined middle position of the lever 40 (refer to FIG. 5A) between the non-engaged position and the completely engaged position. The completely engaged position is a position of the lever 40 at which both of the main circuit switch SW1 and the signal circuit switch SW2 are caused to be in the ON state, and a "completely engaged state" is assumed to be a state in which the pair of main terminals and a pair of communication terminals are in a connected state and the lever 40 is at the completely engaged position. The non-engaged position is a position of the lever 40 at which both of the main circuit switch SW1 and the signal circuit switch SW2 are caused to be in the OFF state, and a "non-engaged state" is assumed to be a state in which the pair of main terminals and the pair of communication terminals are in an unconnected state, and the lever 40 is at the non-engaged position. The half-engaged position is a position of the lever 40 at which the signal circuit switch SW2 is caused to be in the OFF state and the main circuit switch SW1 is caused to be in the ON state, and a "half-engaged state" is assumed to be a state in which the pair of main terminals is in the connected state, the pair of communication terminals is in the unconnected state, and the lever 40 is at the half-engaged position.

A first connector housing 11 as a constituent element of the first connector 10 includes a cylindrical part 15 as illustrated in FIG. 2. The cylindrical part 15 is formed of a surrounding wall erected the disengaging direction Z2 from a bottom part 14 of the first connector housing 11, and has an opening on the upper side in the height direction Z. A main terminal holding part 16 that holds the first main terminal T1 is formed within the cylindrical part 15. The first main terminal T1 is a male terminal in the present embodiment. The first signal terminal T3 is also disposed within the cylindrical part 15. The first signal terminal T3 is a female terminal in the present embodiment. The first main terminal T1 and the first signal terminal T3 are exposed to the outside from the lower side in the height direction Z of the first connector housing 11, and respectively connected to a main electric wire W1 of the power supply circuit and a communication wire W2 of the communication circuit. A position of an upper end in the height direction Z of the first main terminal T1 is disposed to be higher than that of the first signal terminal T3. Due to this, the configuration is made so that the pair of main terminals can maintain the connected state for a longer time than the pair of signal terminals at the time when the first connector 10 is disengaged from the second connector 20 (refer to FIG. 4A).

Protection walls 17 are disposed on both sides in the first width direction Y of the cylindrical part 15 in the first connector housing 11. The protection wall 17 plays a role of protecting a rotation supporting part 25 (described later) from external force in the first width direction Y, for example, in a state in which the first connector 10 is engaged with the second connector 20. The protection wall 17 includes a slide projection 17a. The slide projection 17a is formed to project from the protection wall 17 in a direction of approaching the cylindrical part 15. At the time of engaging the second connector 20 with the first connector 10, a curved part 44 (described later) slides while getting into a lower side of the slide projection 17a following rotation of the lever 40 to energize the second connector 20 toward the first connector 10 in the engaging direction Z2.

The first connector housing 11 includes a flange part 12 on a plane on a plane configured by the first width direction Y and the second width direction X, and on an upper side in the height direction Z of the bottom part 14. Fastening parts 13 for fixing the first connector housing 11 to a case (not illustrated) by bolts are formed at four corners of the flange part 12.

The first main terminal T1 is configured by arranging two conductive plates, each of which is formed in a substantially L-shape by a flat plate part T10 formed on a plane in the height direction Z and the second width direction X and an electric wire connection part T12 extending in the first width direction Y from a lower end of the flat plate part T10, to cause respective surfaces of the flat plate parts T10 to be opposed to each other in the first width direction Y. The power supply circuit is configured by connecting the main electric wire W1 to the electric wire connection part T12, and connecting the first main terminal T1 to the second main terminal T2. The flat plate parts T10 include a plurality of pairs of projecting parts T11, which are formed in the first width direction Y and arranged in the second width direction X. The projecting part T11 is disposed to project in the separating direction Yb from a surface of each of the flat plate parts T10, and formed to extend in the height direction Z. The projecting parts T11 are arranged to be respectively brought into contact with a plurality of contact parts T21b of the second main terminal T2 (described later) at the time when the first connector 10 is engaged with the second connector 20. The projecting parts T11 according to the present embodiment include two types of projecting parts having different lengths in the height direction Z. Herein, a projecting part having a longer length is assumed to be a long projecting part T11a, and a projecting part having a shorter length is assumed to be a short projecting part T11b. In a case in which the two types are not required to be distinguished from each other, they are simply referred to as the projecting part T11. The long projecting part T11a is formed to extend downward from an upper end of the flat plate part T10, an upper end of the short projecting part T11b is at a lower position as compared with an upper end of the long projecting part T11a, and a lower end thereof is at the same height position as a lower end of the long projecting part T11a. In the present embodiment, the three projecting parts T11 in total are assumed to be one group, each of the projecting parts T11 being obtained by disposing short projecting parts T11b on both sides of the long projecting part T11a, and two groups thereof are formed in the second width direction X on each of the flat plate parts T10, so that the first main terminal T1 includes twelve projecting parts T11.

After being crimped to the communication wire W2, two first signal terminals T3 are housed in a sub-housing SH. The sub-housing SH is housed in an inner peripheral space (not illustrated) of the cylindrical part 15 of the first connector housing 11. Thus, the first signal terminal T3 is housed in the first connector housing 11 via the sub-housing SH. The first signal terminal T3 is connected to the second signal terminal T4 housed in a second connector housing 21 as the first connector 10 is engaged with the second connector 20. The two first signal terminals T3 are energized by the second signal terminal T4, so that the signal circuit is caused to be in the ON state.

As illustrated in FIG. 3, the second connector housing 21 as a constituent element of the second connector 20 includes a housing main body 29 and a cover 22 mounted on an upper surface of the housing main body 29. The housing main body 29 is formed to have dimensions and a shape to be able to be engaged/disengaged with/from the cylindrical part 15 of the first connector housing 11.

The second main terminal T2 is disposed on the housing main body 29. The second main terminal T2 is a female terminal in the present embodiment. The first main terminal T1 on the first connector housing 11 side and the second main terminal T2 on the second connector housing 21 side constitute the main circuit switch SW1 of the power supply circuit described above in which the service plug 1 is incorporated.

The second signal terminal T4 is also disposed on the housing main body 29. The second signal terminal T4 is a male terminal in the present embodiment. The signal terminal T3 on the first connector housing 11 side and the signal terminal T4 on the second connector housing 21 side constitute the signal circuit switch SW2. As illustrated in FIG. 4A, the second signal terminal T4 is disposed so that a position of a lower end thereof in the height direction is higher than that of the second main terminal T2. Due to this, the configuration is made so that the pair of signal terminals is caused to be in the connected state at a later timing than the pair of main terminals at the time when the second connector 20 is engaged with the first connector 10. In other words, the second signal terminal T4 is switched to be in the connected state at the time when the second connector 20 is more deeply engaged with the first connector 10 as compared with the second main terminal T2. This timing of switching is preferably a state in which the second connector 20 is engaged with the first connector 10 at the deepest part. Due to this, the signal circuit switch SW2 constituted of the first signal terminal T3 and the second signal terminal T4 can also function as an engagement detection switch for detecting a state in which the second connector 20 is completely engaged with the first connector 10.

The cover 22 includes an outer peripheral cylindrical part 24 extending on the lower side in the height direction Z over the entire circumference of a periphery of an upper surface part 23, and a pair of the rotation supporting parts 25 projects from an outer surface of the outer peripheral cylindrical part 24. The pair of rotation supporting parts 25 is disposed to project outward from the outer peripheral cylindrical part 24 at portions along the second width direction X and at positions opposed to each other along the first width direction Y on the outer peripheral cylindrical part 24. The pair of rotation supporting parts 25 are formed so that axial directions thereof are disposed on the same line. The axial directions of the pair of rotation supporting parts 25 are disposed to be parallel with the first width direction Y.

First half-locking parts 26 are disposed at two positions on a surface on one end part side in the second width direction X of the outer peripheral cylindrical part 24 of the cover 22. The first half-locking part 26 is engaged with a second half-locking part 46 of the lever 40 (described later) to regulate rotation of the lever 40. The first half-locking part 26 includes a first half-locking surface 26a and a first inclined surface 26b. At the time of rotating in a disengaging direction, the lever 40 in the completely engaged state to be in the half-engaged state, the first half-locking surface 26a is engaged with a second half-locking surface 46a (described later) to regulate rotation of the lever 40. On the other hand, at the time of rotating in an engaging direction, the lever 40 in the non-engaged state, the first inclined surface 26b and a second inclined surface 46b only slide, so that rotation of the lever 40 is not regulated by engagement.

A pair of complete locking parts 27 is disposed on the outer peripheral cylindrical part 24 of the cover 22. The pair of complete locking parts 27 is locked into a complete locking groove 48 of the lever 40 to regulate rotation of the lever 40 at the time when the first connector and the second connector are in the completely engaged state.

An inner peripheral cylindrical part 28 is formed on an inner peripheral side of the outer peripheral cylindrical part 24 of the cover 22. The inner peripheral cylindrical part 28 is erected in the engaging direction Z1 from the upper surface part 23, and has an interval between itself and the outer peripheral cylindrical part 24 over the entire circumference. A gasket 30 is housed in a space defined by the outer peripheral cylindrical part 24 and the inner peripheral cylindrical part 28. The gasket 30 is inserted from the lower side in the height direction Z of the cover 22 to be brought into intimate contact with an outer peripheral surface of the inner peripheral cylindrical part 28, and at the time of combining the cover 22 with the housing main body 29, the housing main body 29 prevents an end part in the engaging direction Z1 of the gasket from slipping off. A gap is formed between the gasket 30 and the outer peripheral cylindrical part 24, and the cylindrical part 15 of the first connector housing 11 is inserted into the gap at the time when the first connector 10 is engaged with the second connector 20.

The second main terminal T2 includes a base part T20 and a plurality of contact pieces T21 projecting in the engaging direction Z1 from an end part of the base part T20 disposed therein. The second main terminal T2 according to the present embodiment includes a plurality of pairs of contact pieces T21 opposed to each other in the first width direction Y across the base part T20 disposed therein. In the present embodiment, two second main terminals T2 each including three pairs of the contact pieces T21 (the number of the contact pieces T21 is twelve in total) are disposed in the second width direction X respectively corresponding to the projecting parts T11 formed on the first main terminal T1. The contact piece T21 includes an elastic part T21a that can be elastically displaced in the approaching direction Ya and the disengaging direction Yb, and a contact part T21b to be brought into contact with the first main terminal T1 so as to be brought into elastic contact with the first main terminal T1 at the time when the first connector 10 and the second connector 20 are in the half-engaged state and the completely engaged state. The contact parts T21b included in the respective contact pieces T21 are disposed on the same straight line as portions at which the pair of contact pieces T21 becomes the closest to each other in the first width direction Y.

The lever 40 includes a pair of arm parts 41 and an operation part 42 that couples the pair of arm parts 41 on a rotation distal end side. The pair of arm parts 41 are plate members each having a longitudinal shape (substantially rectangular shape), disposed in parallel with each other so that one of principal planes of one of the arm parts 41 opposed to that of the other arm part 41, and the operation part 42 is coupled to one end part (rotation end part) side in the longitudinal direction of each of the arm parts 41. Due to this, the lever 40 is formed to have a substantially U-shape. In the following description, an extending direction of the substantially U-shape of the lever 40 is represented as a "longitudinal direction" of each of the arm parts 41 and the operation part 42, and a direction orthogonal to the longitudinal direction in which the arm part 41 extends is represented as a "lateral direction".

A pair of rotation receiving parts 45 is disposed on the pair of arm parts 41. The pair of rotation supporting parts 25 of the second connector housing 21 is pivotally supported by the pair of rotation receiving parts 45 from an inner surface side of the arm part 41. Due to this, the lever 40 is disposed on an outer peripheral side of the second connector housing 21 so that inner surfaces of the pair of arm parts 41 are opposed to an outer surface of the outer peripheral cylindrical part 24 of the second connector housing 21, and supported by the second connector housing 21 to be rotatable about an axis of the rotation supporting part 25. More specifically, the lever 40 is configured to be rotatable between the "non-engaged position" at which the longitudinal direction of the arm part 41 becomes the height direction and the operation part 42 on the rotation end part side is in the inverted state of being disposed on the upper side in the height direction Z as illustrated in FIG. 1, and the "completely engaged position" at which the lever 40 rotates by substantially 90 degrees from the non-engaged position toward the lower side in the height direction, and the arm part 41 is disposed while the longitudinal direction thereof becomes the second width direction X as illustrated in FIG. 4A.

The pair of arm parts includes a pair of curved parts at end parts on the opposite side of the rotation end part in the longitudinal direction in a state in which the lever 40 is at the non-engaged position, and on a side opposite to a direction in which the lever 40 is operated to the completely engaged position in the second width direction X.

Two second half-locking parts 46 are formed, in the rotational direction at the time of engagement, on the lever 40 to extend from a lower side of the operation part 42 (the first connector housing 11 side of the lever 40 in the completely engaged state, or a side in the lateral direction disposed between the lever 40 and the first connector housing 11 in the completely engaged state). Regarding the second half-locking part 46, when the lever 40 in the completely engaged state is rotated in the disengaging direction to proceed to the half-engaged state, as illustrated in FIG. 7, the second half-locking surface 46a of the second half-locking part 46 is engaged with the first half-locking surface 26a of the second connector housing 21. Due to this, the second half-locking part 46 can lock (hook) the lever 40 onto the second connector housing 21 to regulate rotation of the lever 40. On the other hand, at the time of rotating the lever 40 in a non-engaged state in the engaging direction, the second inclined surface 46b of the second half-locking part 46 and the first inclined surface 26b of the first half-locking part 26 only slide, so that rotation of the lever 40 is not regulated.

The lever 40 includes a half-lock releasing part 47 that is integrally disposed between the second half-locking parts 46. The half-lock releasing part 47 is a part for releasing a lock state of the second half-locking part 46 in the lock state in which the second half-locking part 46 is engaged with the first half-locking part 26 of the second connector housing 21. The half-lock releasing part 47 is configured to be elastically deformable. In the lock state described above, when operation force toward an outer side in the second width direction X with respect to the second connector housing 21 is applied to the half-lock releasing part 47, the second half-locking surface 46a of the second half-locking part 46 can be removed from the first half-locking surface 26a to release the lock state.

Figure 4B:
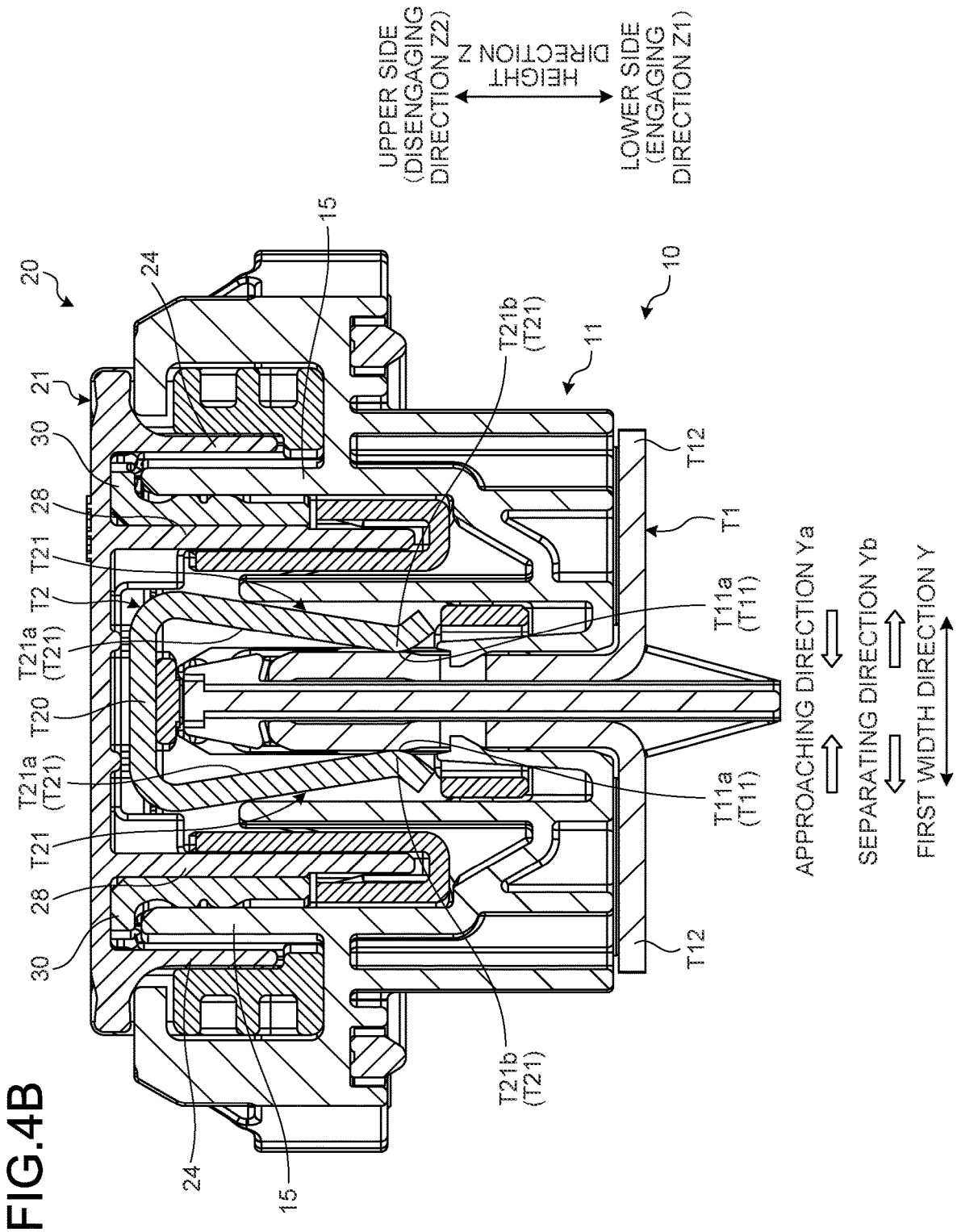
FIG. 4B is a cross-sectional view in a first width direction Y of the service plug at the time of completely engaged state.
Figure 5B:
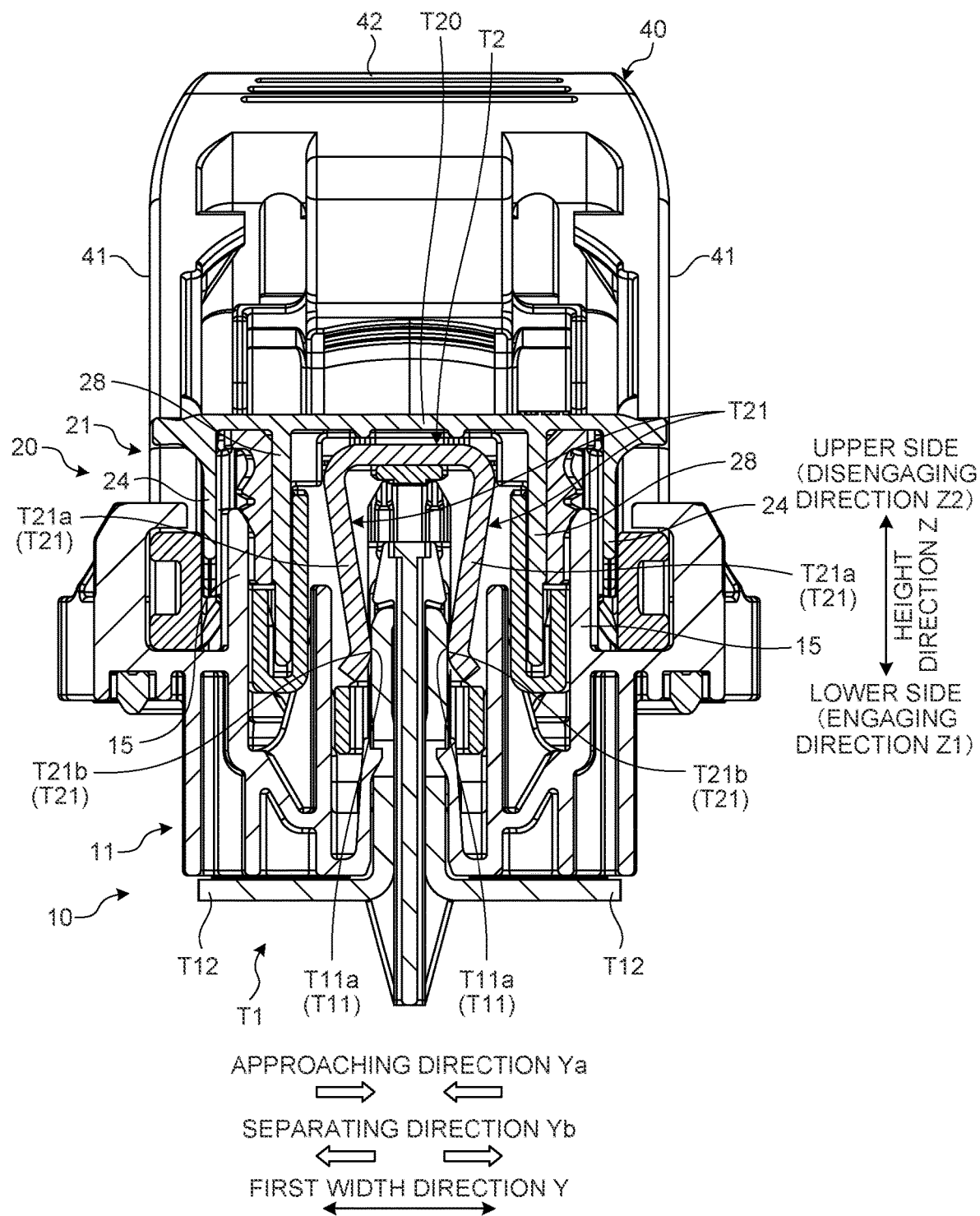
FIG. 5B is a cross-sectional view in the first width direction Y of the service plug at the time of half-engaged state.
Figure 6B:
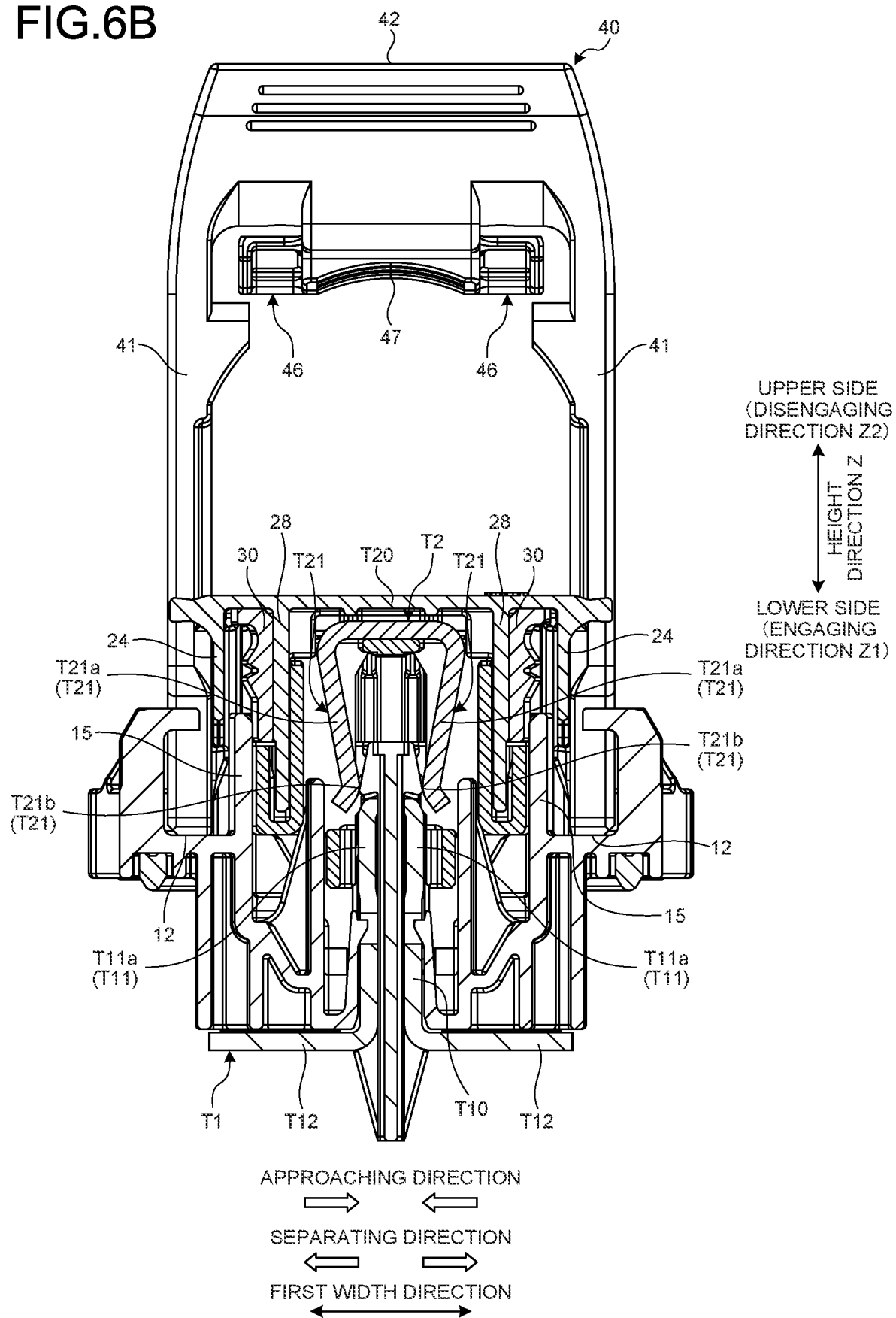
FIG. 6B is a cross-sectional view in the first width direction Y of the service plug at the time of non-engaged state.

Next, with reference to FIG. 4A to FIG. 6B, the following describes a breaking operation for the power supply circuit performed by the service plug 1 (power supply circuit breaker device) according to the present embodiment. FIG. 4A is a cross-sectional view of the service plug 1 illustrating the completely engaged state in which the lever 40 is positioned at the completely engaged position in the breaking operation for the power supply circuit performed by the service plug 1 according to the present embodiment. FIG. 4B is a cross-sectional view in the first width direction Y of the service plug 1 in the completely engaged state. FIG. 5B is a cross-sectional view in the first width direction Y of the service plug 1 illustrating the half-engaged state in which the lever 40 is positioned at the half-engaged position in the breaking operation for the power supply circuit performed by the service plug 1 of the present embodiment. FIG. 6B is a cross-sectional view in the first width direction Y of the service plug 1 in the non-engaged state.

First, the following describes a conduction operation for the power supply circuit as a precondition for the breaking operation for the power supply circuit. Basically, the conduction operation can be performed by performing the breaking operation sequentially illustrated in FIG. 4A (FIG. 4B), FIG. 5A (FIG. 5B), and FIG. 6A (FIG. 6B) in reverse order. In this conduction operation, an engaging operation is performed for engaging the second connector housing 21 with the first connector housing 11 by a rotation operation for the lever 40 from the non-engaged position to the completely engaged position, and accordingly, the first main terminal T1, the second main terminal T2, the first signal terminal T3, and the second signal terminal T4 within the first connector housing 11 and the second connector housing 21 are connected to cause the power supply circuit to be in the conductive state.

In this conduction operation, the second connector 20 in which the lever 40 is positioned at the non-engaged position is inserted into the cylindrical part 15 of the first connector 10, and the curved part 44 of the lever 40 approaches the slide projection 17a of the first connector housing 11 in the second width direction X. At this point, both of the pair of main terminals and the pair of signal terminals are in the unconnected state, and both of the main circuit switch SW1 and the signal circuit switch SW2 are in the OFF state.

Next, the lever 40 is rotated to the completely engaged position side from the non-engaged position through the half-engaged position. Due to this, the curved part 44 slides while getting into the lower side of the slide projection 17a to energize the second connector 20 in the engaging direction Z2 toward the first connector 10. Due to this, engagement force acts between the second connector 20 and the first connector 10, and the second connector 20 relatively moves in the engaging direction to be gradually inserted into the cylindrical part 15 of the first connector 10.

When the lever 40 is rotated to the completely engaged position, the second connector 20 is engaged with the first connector 10 at the deepest position. At this point, both of the pair of main terminals and the pair of signal terminals are caused to be in the connected state, and both of the main circuit switch SW1 and the signal circuit switch SW2 are caused to be in the ON state. As a result, the power supply circuit can be caused to be in the conductive state.

The conduction operation for the power supply circuit has been described above. Next, the following describes the breaking operation for the power supply circuit using the service plug 1 that is caused to be in the completely engaged state by the conduction operation.

First, in the completely engaged state illustrated in FIG. 4A, the second connector 20 is engaged with the first connector 10 at the deepest position, and the lever is positioned at the completely engaged position. At this point, as illustrated in FIG. 4A and FIG. 4B, within the service plug 1, the main terminal T2 in the second connector housing 21 is connected to the first main terminal T1 in the first connector housing 11, and the signal terminal T4 in the second connector housing 21 is connected to the signal terminal T3 in the first connector housing 11. Thus, both of the main circuit switch SW1 and the signal circuit switch SW2 are in the ON state, and the power supply circuit is in the conductive state.

For the service plug 1 in the completely engaged state, operation force in a direction toward the non-engaged position is applied to the lever operation part 42 by an operator who performs the breaking operation, the lever 40 starts to rotate from the completely engaged position toward the non-engaged position side as in the half-engaged state illustrated in FIG. 5A. At this point, when the lever 40 is rotated while an end part on the opposite side of the rotation end part in the longitudinal direction of the lever 40 slides with respect to the flange part 12 of the first connector housing 11, the second connector is energized in the disengaging direction 22. Due to this, disengaging force acts between the second connector 20 and the first connector 10, and the second connector 20 relatively moves in the disengaging direction to be gradually disengaged from the cylindrical part 15 of the first connector 10.

When rotation of the lever 40 proceeds, the lever 40 reaches the half-engaged position as in the half-engaged state illustrated in FIG. 5A. At this point, the second half-locking part 46 of the lever 40 is locked to the first half-locking part 26 of the second connector housing 21, the lever 40 is caused to be in a state of being locked to the second connector housing 21, and rotation of the lever 40 is temporarily regulated. As the lever 40 is rotated from the completely engaged position to the half-engaged position, disengagement of the second connector 20 from the first connector 10 proceeds. Due to this, as illustrated in FIGS. 5A and 5B, the signal terminal T4 in the second connector housing 21 is separated from the signal terminal T3 in the first connector housing 11. On the other hand, while the second main terminal T2 in the second connector housing 21 also moves in the disengaging direction, the pair of main terminals still maintains the connected state. Thus, in a case of a rotation operation for the lever 40 from the completely engaged position, the pair of signal terminals is switched to be in the unconnected state, and the signal circuit switch SW2 is switched to be in the OFF state at the half-engaged position illustrated in FIG. 5A. That is, in a state in which the lever 40 is positioned at the half-engaged position, the main circuit switch SW1 is in the ON state, and the signal circuit switch SW2 is in the OFF state.

When rotation of the lever 40 further proceeds from the half-engaged position illustrated in FIG. 5A, the lever 40 reaches the non-engaged position as in the non-engaged state illustrated in FIG. 6A. In the non-engaged state, as illustrated in FIGS. 6A and 6B, the second main terminal T2 in the second connector housing 21 is separated from the first main terminal T1 in the first connector housing 11. Thus, in a case of the rotation operation for the lever 40 from the completely engaged position, at the non-engaged position illustrated in FIGS. 6A and 6B, the pair of main terminals is switched to be in the unconnected state, and the main circuit switch SW1 is switched to be in the OFF state. That is, in a state in which the lever 40 is positioned at the non-engaged position, both of the main circuit switch SW1 and the signal circuit switch SW2 are in the OFF state. As a result, the power supply circuit can be caused to be in the breaking state.

Next, the following describes functions and effects of the service plug 1 according to the present embodiment.

Figure 8A:
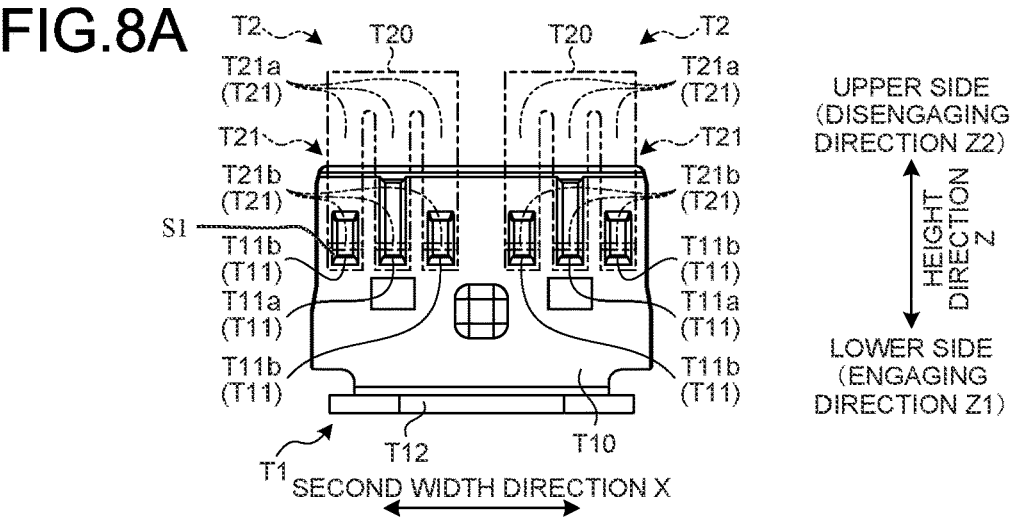
FIGS. 8A to 8C are schematic diagrams illustrating a contact state of a pair of main terminals at the time of the completely engaged state, the half-engaged state, and the non-engaged state.
Figure 8B:
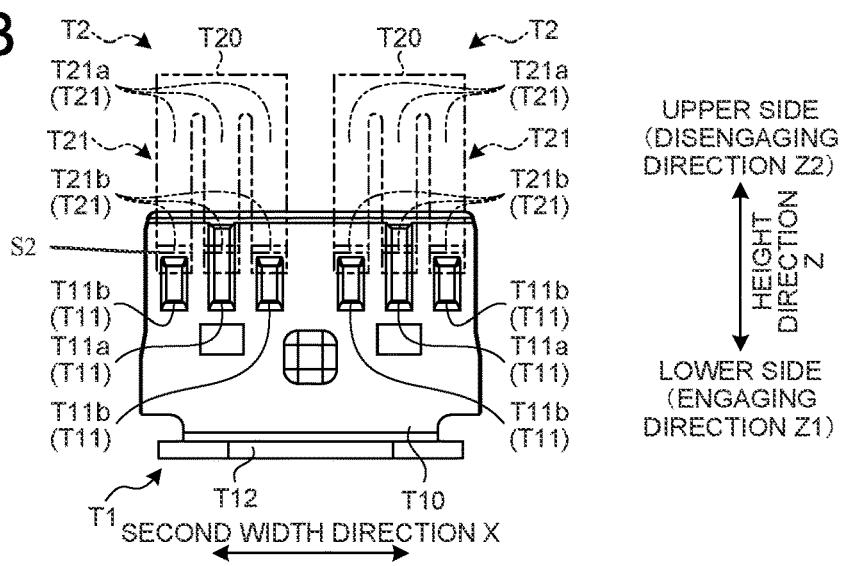
Figure 8C:
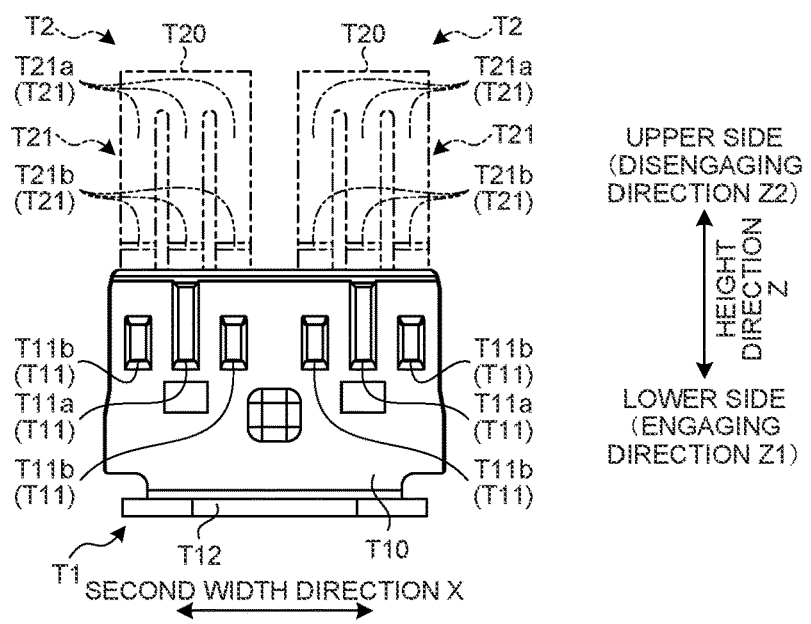

FIGS. 8A to 8C illustrate a contact state of the pair of main terminals at the time when the first connector 10 and the second connector 20 are in the completely engaged state, the half-engaged state, and the non-engaged state. When the first connector 10 and the second connector 20 are in the completely engaged state, the contact parts T21b of the contact pieces T21 are respectively brought into elastic contact with the projecting parts T11 disposed on the flat plate part T10 of the first main terminal T1 (refer to FIG. 8A). On the other hand, when the first connector 10 and the second connector 20 are caused to be in the half-engaged state from the completely engaged state, part of the contact parts T21b corresponding to short projecting parts T11b is separated from the short projecting parts T11b to be brought into elastic contact with a surface of the flat plate part T10 of the first main terminal T1 (refer to FIG. 8B). The other part of the contact parts T21b corresponding to long projecting parts T11a maintains contact with the long projecting parts T11a (refer to FIG. 8B). In this case, a position in the approaching direction Ya at which the contact parts T21b are brought into elastic contact with the projecting parts in the completely engaged state is assumed to be a contact position S1 at the time of complete engagement, and a position in the approaching direction Ya at which part of the contact parts T21b is brought into elastic contact with the surface of the flat plate part T10 in the half-engaged state is assumed to be a contact position S2 at the time of half-engagement.

When part of the contact parts T21b is displaced from the contact position at the time of complete engagement to the contact position at the time of half-engagement, the contact position with respect to the first main terminal T1 is displaced from the contact position S1 at the time of complete engagement to the contact position S2 at the time of half-engagement (refer to FIG. 8B). Due to the displacement to the contact position S2 at the time of half-engagement, part of the contact parts T21b is further displaced in the approaching direction Ya, and elastic force is released. Thus, elastic force of part of the contact pieces T21 becomes smaller than elastic force at the contact position S1 at the time of complete engagement, so that a contact pressure between part of the contact pieces T21 and the first main terminal T1 is lowered. This function lowers the entire contact pressure between the pair of main terminals, suppresses static friction force that is generated between the pair of main terminals at the time of rotating the lever 40 again the rotation of which is temporarily stopped in the half-engaged state, and improves workability related to breaking of the power supply circuit.

The embodiment of the present invention has been described above, but the embodiment described above is merely an example, and does not intend to limit the scope of the invention. The embodiment described above can be implemented in other various forms, and can be variously omitted, replaced, or modified without departing from the gist of the invention. The embodiment and the modification described above are encompassed by the scope or the gist of the invention, and similarly encompassed by the invention described in CLAIMS and equivalents thereof.

The service plug 1 may have a configuration other than the embodiment described above. For example, the embodiment described above exemplifies a configuration in which the second signal terminal T4 is disposed in the second connector housing 21 together with the second main terminal T2, but the second signal terminal T4 may be disposed in the lever 40. The embodiment described above exemplifies the LIF connector, but other lever-type connectors may also be used.

The embodiment described above exemplifies a configuration of regulating rotation of the lever 40 by locking the lever 40 to the second connector housing 21 at the time when the lever 40 is rotated from the completely engaged position to the half-engaged position, but the lever 40 may be locked to the first connector housing 11.

In the embodiment described above, the configuration is made such that the contact pieces T21 are brought into elastic contact with the projecting parts T11 in the completely engaged state, and part of the contact pieces T21 are brought into elastic contact with the surface of the flat plate part T10 in the half-engaged state, but the embodiment is not limited thereto. For example, the configuration may be made such that the contact pieces T21 are brought into elastic contact with the surface of the flat plate part T10 in the completely engaged state, and part of the contact pieces T21 is brought into elastic contact with a groove portion obtained by recessing the surface of the flat plate part T10 in the approaching direction Ya in the half-engaged state. In short, the configuration may be made such that, at the time when the first connector 10 and the second connector 20 are caused to be in the half-engaged state from the completely engaged state, part of the contact pieces T21 is brought into elastic contact with the first main terminal T1 at a position displaced in the approaching direction Ya, and the other part of the contact pieces T21 maintains elastic contact with the first main terminal T1 without being displaced in the approaching direction Ya and the disengaging direction Yb.

In the power supply circuit breaker device according to the present embodiment, when the lever is rotated from the completely engaged position to the predetermined middle position at the time of operation of breaking the power supply circuit, the contact position between part of the contact pieces and one of the pair of first terminals is displaced in a direction in which elastic force of the contact piece is released. As a result, effects are exhibited such that a contact pressure generated between the pair of first terminals is lowered, static friction force that is generated between the pair of first terminals at the time of repeated rotation of the lever is suppressed, and workability at the time of disengaging the connector is improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply circuit breaker device comprising:
a pair of first terminals configured to switch between an energizable state and a breaking state of a power supply circuit by being connected with and released from each other, respectively;
a pair of second terminals configured to switch between an energized state and a non-energized state of the power supply circuit by being connected with and released from each other, respectively;
a first connector housing including one of the pair of first terminals and one of the pair of second terminals;
a second connector housing that includes the other one of the pair of first terminals, and is disposed to be able to be engaged with the first connector housing;
a lever that is disposed on the second connector housing in a rotatable manner, includes an operation part at a rotation end part, and is configured to rotate relative to each of the first connector housing and the second connector housing between a completely engaged position at which the operation part side becomes the closest to the first connector housing side and a non-engaged position at which the operation part side becomes the most distant from the first connector housing;
a lock part configured to lock the lever to the first connector housing or the second connector housing to regulate rotation of the lever in a state in which the lever is positioned at a predetermined middle position between the completely engaged position and the non-engaged position; and
a lock releasing part configured to release a lock state of the lock part, wherein
the other one of the pair of second terminals is disposed on the lever or the second connector housing,
the pair of first terminals are in a connected state with each other and the pair of second terminals are in a connected state with each other when the power supply circuit breaker device is in a completely engaged state in which the second connector housing is engaged with the first connector housing and the lever is positioned at the completely engaged position,
the pair of first terminals is in the connected state with each other and the pair of second terminals is in an unconnected state with each other when the power supply circuit breaker device is in a half-engaged state in which the lever is positioned at the middle position and rotation of the lever is regulated by the lock part,
the other one of the pair of first terminals includes a plurality of contact pieces that are able to be elastically displaced in a direction in which elastic force acts on one of the pair of first terminals,
in the completely engaged state, the contact pieces are at a position at which the contact pieces are brought into elastic contact with one of the pair of first terminals in a direction in which the elastic force acts, and
in the half-engaged state, a part of the contact pieces are brought into elastic contact with one of the pair of first terminals in a direction in which the elastic force acts as in the completely engaged state, and the other part of the contact pieces is brought into elastic contact with one of the pair of first terminals at a position that is further displaced in a direction in which the elastic force acts as compared with a position in the completely engaged state.

2. The power supply circuit breaker device according to claim 1, wherein
a contact pressure applied to a contact between the pair of first terminals connected to each other is larger than a contact pressure applied to a contact between the pair of second terminals connected to each other.

3. The power supply circuit breaker device according to claim 1, wherein
one of the pair of first terminals includes a flat plate part that is formed in a plane shape along an inserting and extracting direction of the second connector housing with respect to the first connector housing,
a plurality of projecting parts that are able to be brought into contact with the respective contact pieces are formed on a surface of the flat plate part,
the projecting parts have a length along the inserting and extracting direction so that
the projecting parts are respectively brought into contact with the contact pieces in the completely engaged state, and
the part of the contact pieces is separated from a part of the projecting parts and brought into elastic contact with the flat plate part, and the other part of the contact pieces is brought into elastic contact with the other part of the projecting parts in the half-engaged state.

4. The power supply circuit breaker device according to claim 2, wherein
one of the pair of first terminals includes a flat plate part that is formed in a plane shape along an inserting and extracting direction of the second connector housing with respect to the first connector housing,
a plurality of projecting parts that are able to be brought into contact with the respective contact pieces are formed on a surface of the flat plate part,
the projecting parts have a length along the inserting and extracting direction so that
the projecting parts are respectively brought into contact with the contact pieces in the completely engaged state, and
the part of the contact pieces is separated from a part of the projecting parts and brought into elastic contact with the flat plate part, and the other part of the contact pieces is brought into elastic contact with the other part of the projecting parts in the half-engaged state.

* * * * *